(12) United States Patent
Griffin et al.

(10) Patent No.: US 8,462,119 B2
(45) Date of Patent: Jun. 11, 2013

(54) METHOD OF FACILITATING USER INPUT IN HANDHELD ELECTRONIC DEVICE EMPLOYING A TEXT DISAMBIGUATION FUNCTION

(75) Inventors: Jason Griffin, Kitchener (CA); Carlos Perez, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 718 days.

(21) Appl. No.: 11/971,472

(22) Filed: Jan. 9, 2008

(65) Prior Publication Data

US 2009/0174665 A1    Jul. 9, 2009

(51) Int. Cl.
*G06F 3/02*    (2006.01)

(52) U.S. Cl.
USPC .......................................... 345/169; 345/156

(58) Field of Classification Search
USPC .................. 345/156–184; 455/563–575.1
See application file for complete search history.

(56) References Cited

U.S. PATENT DOCUMENTS

| | | | |
|---|---|---|---|
| 6,204,848 B1* | 3/2001 | Nowlan et al. | 715/810 |
| 7,453,439 B1* | 11/2008 | Kushler et al. | 345/168 |
| 7,502,632 B2* | 3/2009 | Ciminelli | 455/563 |
| 2002/0093490 A1 | 7/2002 | Lee | |
| 2003/0179185 A1* | 9/2003 | Iwamura et al. | 345/168 |
| 2003/0236658 A1* | 12/2003 | Yam | 704/2 |
| 2004/0153963 A1 | 8/2004 | Simpson et al. | |
| 2005/0017954 A1* | 1/2005 | Kay et al. | 345/169 |
| 2005/0144566 A1* | 6/2005 | Zhang | 715/810 |
| 2005/0283358 A1 | 12/2005 | Stephanick et al. | |
| 2006/0206816 A1 | 9/2006 | Nordenhake | |
| 2006/0290535 A1* | 12/2006 | Thiesson et al. | 341/22 |
| 2007/0276650 A1* | 11/2007 | Kotipalli et al. | 704/8 |
| 2008/0100579 A1* | 5/2008 | Robinson et al. | 345/168 |

FOREIGN PATENT DOCUMENTS

| | | |
|---|---|---|
| EP | 1 681 618 A | 7/2006 |
| EP | 1 701 243 A | 9/2006 |
| EP | 1 710 667 A | 10/2006 |
| WO | 00/43208 A | 7/2000 |
| WO | 00/62150 A | 10/2000 |

OTHER PUBLICATIONS

Office Action in corresponding Canadian Application No. 2,648,817, mailed by the Canadian Patent Office on Apr. 16, 2012 (5 pages).
Communication pursuant to Article 94(3) EPC in corresponding European Application No. 08150126.4, mailed by the European Patent Office on Feb. 15, 2013 (7 pages).

* cited by examiner

*Primary Examiner* — Christopher E Leiby
(74) *Attorney, Agent, or Firm* — Finnegan, Henderson, Farabow, Garrett & Dunner, LLP

(57) ABSTRACT

Methods of facilitating input into a handheld electronic device based on the intent of the user wherein possible intended inputs generated by the text disambiguation function of the handheld electronic device are grouped and displayed in particular directional orientations. A multi-directional navigation mechanism may then be used to select a particular one of the possible intended inputs by providing a direction input that corresponds to the direction of the group that includes the desired possible intended input.

16 Claims, 5 Drawing Sheets

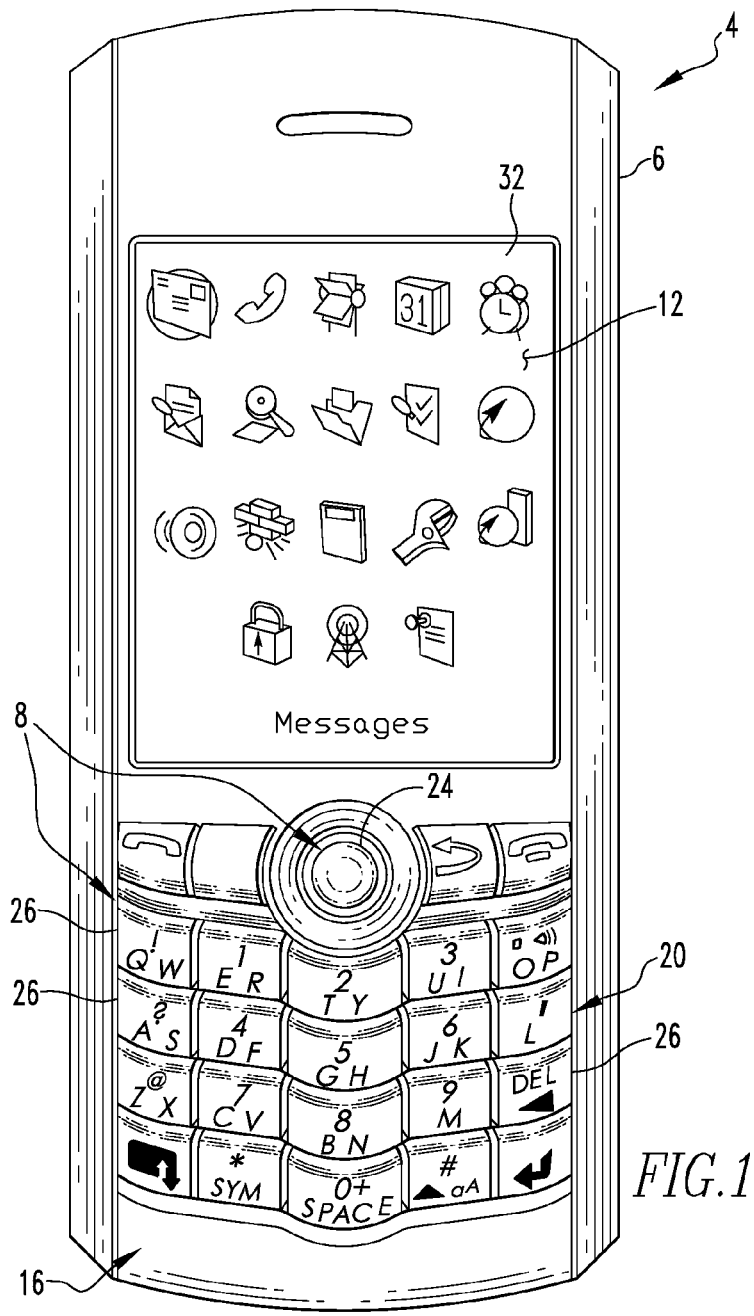
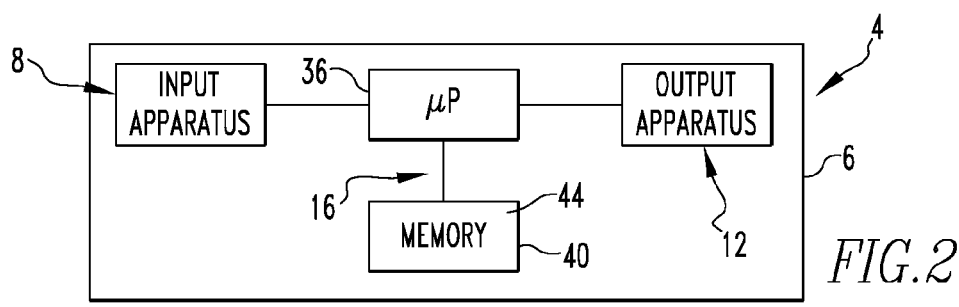
FIG.1
FIG.2

METHOD OF FACILITATING USER INPUT IN HANDHELD ELECTRONIC DEVICE EMPLOYING A TEXT DISAMBIGUATION FUNCTION

BACKGROUND

1. Field

The disclosed and claimed concept relates generally to handheld electronic devices employing a text disambiguation function, and, more particularly, to a method that is executable on a handheld electronic device that facilitates user input based on the intent of the user.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keyboard by providing twelve keys, of which ten have digits thereon, and of these ten keys, eight have Roman letters assigned thereto. For instance, one of the keys includes the digit "2" as well as the letters "A", "B", and "C". Since a single actuation of such a key potentially could be intended by the user to refer to any of the letters "A", "B", and "C", and potentially could also be intended to refer to the digit "2", the input (by actuation of the key) generally is an ambiguous input and is in need of some type of disambiguation in order to be useful for text entry purposes. Other known reduced keyboards have included other arrangements of keys, letters, symbols, digits, and the like. One example of a reduced keyboard is the keypad 20 forming a part of the handheld electronic device 4 shown in FIG. 1 and described in greater detail herein. Keypad 20 is what is known as a reduced QWERTY keyboard.

In order to enable a user to make use of the multiple letters, digits, and the like on any given key in an ambiguous keyboard, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", if the user desires to specify the letter "C", the user will press the key three times. Similarly, on the aforementioned keypad 24, if the user desires to specify the letter "C", the user will press the key that includes "CV7" once, and if the user desires to specify the letter "I", the user will press the key that includes "UI3" two times.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed. One example of such a system is disclosed in commonly owned United States Patent Application Publication No. 2006/0058995, entitled "Handheld Electronic Device With Text Disambiguation," the disclosure of which is incorporated herein by reference. As is known, many such systems display an output component as the user is typing (pressing keys) that includes a list of possible intended input character strings (i.e., what the user intended while typing) that are generated by the disambiguation software. For example, FIG. 3 shows an exemplary prior art output screen 50 that may be provided by the disambiguation software system described in the aforementioned commonly owned United States Patent Application Publication No. 2006/0058995. As seen in FIG. 3, the output screen 50 includes a text component 52 and a variant component 54. The variant component 54 includes a default portion 56 and a variant portion 58. The variant component 54 represents a list of possible intended inputs (in the form of a number of character strings or combinations) as generated by the disambiguation software. A user may select one of the items listed in the variant component 54 for inclusion in the final text component 52.

In the example output screen 50, the user has pressed the "AS" key followed by the "ER" key followed by the "ER" key again. As a result, the variant component 54 lists the following possible intended inputs: "are", "see", "ser", "aer" and "arr". The "are" and "see" possible intended inputs represent words (in the current language of the handheld electronic device) that may have been intended by the user (with "are" being the default), and the "ser", "aer" and "arr" possible intended inputs represent other letter sequences (corresponding to the pressed keys) that do not represent words (in the current language of the handheld electronic device) that nonetheless may have been intended by the user. In addition, the "arr" possible intended input represents a possible intended input wherein the last character of the possible intended input of the default portion 56 ("are") as been "flipped" to the other character provided on the key corresponding to that last character. In any given circumstance, the user may have intended any one of the possible intended inputs, and may wish to select one of them for inclusion in the final text component 52. If the user wishes to select the possible intended input of the default portion 56, that is relatively easy because, as shown in FIG. 3, that possible intended input is by default included in the final text component 52 and is highlighted in the variant component 54. However, additional user action is required if one of the possible intended inputs of the variant component 54 is desired by the user, which action typically includes scrolling or stepping through the possible intended inputs of the variant component 54 on the output screen. If the number of possible intended inputs of the variant component 54 is large, this will be time consuming and often frustrating for the user, especially if the possible intended inputs of the variant component 54 span more two or more additional screens. Furthermore, existing systems do not organize the possible intended inputs of the variant component 54 based on the user's possible intent while typing. A user will, however, know their intent while typing, such as whether they are trying to enter a word or whether they are trying to input a character sequence that is not a word.

There is thus room for improvement in handheld electronic devices that employ text disambiguation functions, and in particular there is a need for methods for facilitating user input in such handheld electronic devices based on the intent of the user.

BRIEF DESCRIPTION OF THE DRAWINGS

A full understanding of the disclosed and claimed concept can be gained from the following Description of the Example Embodiments when read in conjunction with the accompanying drawings in which:

FIG. 1 is a front view of an improved handheld electronic device in accordance with the disclosed and claimed concept;

FIG. 2 is a block diagram of the handheld electronic device of FIG. 1;

DESCRIPTION OF THE EXAMPLE EMBODIMENTS

Figure 3:
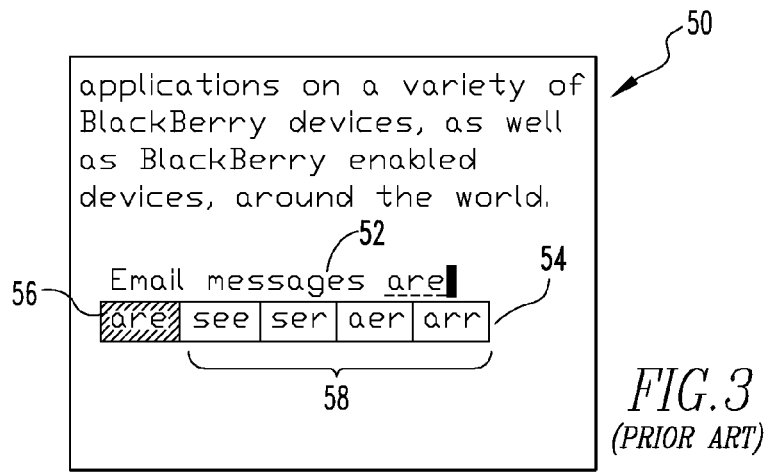
FIG. 3 is a schematic representation of a prior art output screen of a handheld electronic device which includes a text disambiguation routine.

In one embodiment, the disclosed and claimed concept provides a method of facilitating input into a handheld electronic device based on the intent of the user. The handheld electronic device includes a text disambiguation function, a multi-directional navigation mechanism, such as a trackball, a joystick, a touch screen, or a similar device, a display and a reduced keyboard, such as, without limitation, a reduced QWERTY keyboard, having a plurality of keys, wherein one or more of the keys has multiple characters provided thereon. The method includes receiving an ambiguous input resulting from a selection of a plurality of the keys, generating a plurality of possible intended input strings based on the ambiguous input using the text disambiguation function, organizing the possible intended input strings into a plurality of groups (with each of the groups including one or more of the possible intended input strings), displaying each of the groups on the display in a respective directional orientation relative to a reference location on the display, and enabling the selection of one of the possible intended input strings based on a directional input received from the multi-directional navigation mechanism. In particular, the directional input received from the multi-directional navigation mechanism is in a direction that corresponds to the directional orientation of the group that includes the desired one of the possible intended input strings.

In one particular embodiment, the groups include a first group and a second group, wherein the one or more possible intended input strings in the first group represent words in the current language of the handheld electronic device and the one or more possible intended input strings in the second group do not represent words in the current language of the handheld electronic device. In addition, the plurality of groups may also include a third group including an input string wherein the final character of a default string has been flipped to the other character on the key corresponding to the final character of the default string. In a particular embodiment, the respective directional orientation of the first group is perpendicular to the respective directional orientation of the second group, and the respective directional orientation of the third group is parallel and opposite to the respective directional orientation of the second group. For example, the respective directional orientation of the first group may be a horizontal orientation, the respective directional orientation of the second group may be a downward vertical orientation, and the respective directional orientation of the third group may be an upward vertical orientation.

The disclosed and claimed concept also provides an alternative method of facilitating input into a handheld electronic device based on the intent of the user. The handheld electronic device includes a text disambiguation function, a multi-directional navigation mechanism, such as a trackball, a joystick, a touch screen, or a similar device, a display and a reduced keyboard having a plurality of keys, wherein one or more of the keys has multiple characters provided thereon. The method includes receiving an ambiguous input resulting from a selection of a plurality of the keys, generating a plurality of possible intended input strings based on the ambiguous input using the text disambiguation function, displaying a group of one or more of the possible intended input strings on the display in a first directional orientation relative to a reference location on the display, wherein the one or more possible intended input strings in the group represent words in the current language of the handheld electronic device, and displaying an alternate character on the display in a second directional orientation relative to the reference location that is different from the first directional orientation. The possible intended input strings in the group includes a default string having one or more initial characters and a final character. The final character and the alternate character are both disposed on the same one of the keys. The method further includes enabling the selection of one of the possible intended input strings in the group based on a first directional input received from the multi-directional navigation mechanism, the first directional input being in a direction that corresponds to the first directional orientation, and enabling the selection of the alternate character based on a second directional input received from the multi-directional navigation mechanism, the second directional input being in a direction that corresponds to the second directional orientation: In addition, the method may further include, in response to a third directional input which selects one of the initial characters and which is in a direction different from the first directional input and the second directional input, (i) replacing the alternate character with a second alternate character, the one of the initial characters and the second alternate character both being disposed on the same one of the keys, and (ii) enabling the selection of the second alternate character based on a fourth directional input received from the multi-directional navigation mechanism, the fourth directional input being in a direction that corresponds to the second directional orientation.

The disclosed and claimed concept also provides for handheld electronic devices which implement the various method embodiments just described.

An improved handheld electronic device 4 in accordance with the disclosed and claimed concept is indicated generally in FIG. 1 and is depicted schematically in FIG. 2. The improved handheld electronic device 4 comprises a housing 6, and further comprises an input apparatus 8, an output apparatus 12, and a processor apparatus 16 disposed in the housing 6. The input apparatus 8 provides input to the processor apparatus 16. The processor apparatus 16 provides output signals to the output apparatus 12.

The input apparatus 8 comprises a keypad 20 and a trackball 24. The keypad 20 in the exemplary embodiment depicted herein comprises a plurality of keys 26 that are each actuatable to provide input to the processor apparatus 16. The trackball 24 is rotatable to provide navigational and other input to the processor apparatus 16, and additionally is translatable in a direction inwardly toward the handheld electronic device 4 to provide other inputs, such as selection inputs. The trackball 24 is freely rotatable on the housing 6 and thus is able to provide navigational inputs in the vertical direction, i.e., the up-down direction, in the horizontal direction, i.e., the left-right (side to side) direction, as well as combinations thereof. In additional, the trackball 24 may be adapted to provide navigational inputs in diagonal directions. The keys 26 and the trackball 24 serve as input members which are actuatable to provide input to the processor apparatus 16. Alternative mechanisms for providing similar multi-directional navigation may be used in place of the trackball 24, such as, without limitation, a joystick, a touchpad, a touch-sensitive display, and hard buttons disposed on the housing 6 of the handheld electronic device 4. The exemplary output apparatus 12 comprises a display 32.

Many of the keys 26 each have a plurality of letters, i.e., linguistic elements, assigned thereto. For instance, one of the keys 26 has assigned thereto the letters "A" and "S". Another of the keys 26 has assigned thereto the letters "Q" and "W". The letters of the exemplary keypad 20 are in an arrangement of a reduced QWERTY keyboard.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to any nonzero quantity, including a quantity of one. One or more of the routines 44 implement a text disambiguation function that is operable to disambiguate ambiguous text input, such as when one or more of the keys 26 having a plurality of letters assigned thereto is actuated, and provide to the user a number of possible intended inputs that may be selected.

Figure 4:
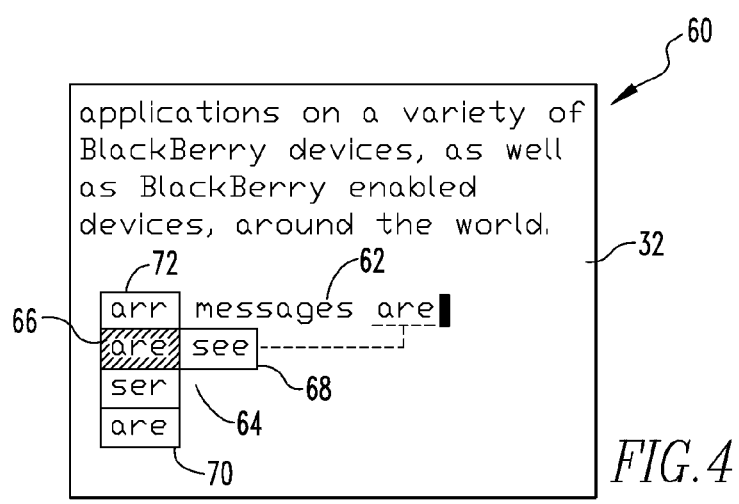
FIGS. 4-13 are schematic representations of output screens of the handheld electronic device of FIGS. 1 and 2 according to various embodiments of the disclosed and claimed concept.

The disclosed and claimed concept provides a display and selection method which organizes the possible intended inputs that are output by the text disambiguation function based on the user's intent and employs the multi-directional input that may be provided using the trackball 24 or a similar device in order to allow the user to express actual intent and more easily make a selection of one of the displayed possible intended inputs. One embodiment of such a display and selection method is illustrated in connection with FIG. 4. As seen in FIG. 4, when a user of the handheld electronic device 4 is inputting text using the text disambiguation function, such as, without limitation, when the user is using the email or SMS functionality of the handheld electronic device 4, an output screen 60 is provided on the display 32. In the example shown in FIG. 4, the output screen 60 results from the user pressing the "AS" key 26 followed by the "ER" key 26 followed by the "ER" key 26 again (the possible intended inputs are "are", "see", "ser", "aer" and "arr"). As seen in FIG. 4, the output screen 60 includes a text component 62 and a variant component 64. The variant component 64 represents a list of possible intended inputs (in the form of a number of character strings or combinations) as generated by the text disambiguation function. The variant component 64 is different than the variant component 54 shown in FIG. 3 in that it is not oriented in a straight line like the variant component 54, but instead extends in a multi-directional fashion. In the embodiment shown in FIG. 4, the variant component 64 extends in vertical (up and down) and horizontal (left and right) directions. Specifically, the variant component 64 includes a default portion 66, a first variant portion 68 including one or more possible intended inputs that extends to the right of the default portion 66, a second variant portion 70 including one or more possible intended inputs that extends downwardly from the default portion 66, and a third variant portion 72 including one possible intended input that extends upwardly from the default portion 66. More specifically, the first variant portion 68 includes possible intended inputs that represent words that may have been intended by the user ("see"), the second variant portion 70 includes possible intended inputs that represent other letter sequences (corresponding to the pressed keys) that do not represent words that nonetheless may have been intended by the user ("ser" and "aer"), and the third variant portion 72 includes a possible intended input wherein the last character of the possible intended input of the default portion 66 ("are") has been "flipped" to the other character ("r") provided on the key 26 corresponding that last character (the "ER" key 26). As such, the possible intended inputs of the variant component 64 are organized and displayed based on the user's possible intent when pressing the keys 26.

According to an aspect of the disclosed and claimed concept, a user is able to select one of the possible intended inputs of the variant component 64 by using the trackball 24 to navigate from the default portion 66 in either an up-down manner or a left-right (side to side) manner so as to highlight a desired one of the possible intended inputs, and may select the desired one of the possible intended inputs once highlighted by pressing the trackball 24. User input is thus simplified as less navigation and/or actuation steps are required to select the desired one of the possible intended inputs of the variant component 64. Once selected in this manner, the desired one of the possible intended inputs of the variant component 64 is added to the text component 62 (it will replace the default string ("are") shown in FIG. 4).

Figure 5:
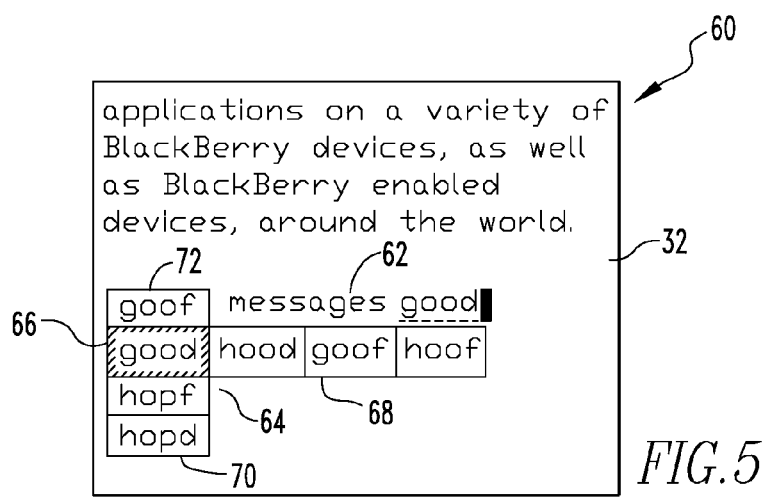

FIG. 5 is another example of the output screen 60 that is provided on the display 32. In the example shown in FIG. 5, the output screen 60 results from the user pressing the "GH" key 26 followed by the "OP" key 26 followed by the "OP" key 26 again followed "DF" key 26. The possible intended inputs generated by the text disambiguation function are "good", "hood", "goof", "hoof" and "hopf", "hopd" and "goof". The "good" possible intended input is the default portion 66, the "hood", "goof", "hoof" possible intended inputs are words, and thus are included in the first variant portion 68, the "hopf" and "hopd" possible intended inputs are not words, and thus are included in the second variant portion 70, and the "goof" possible intended input (which is a word) is included in the third variant portion 72 because it is the possible intended input wherein the last character of the possible intended input of the default portion 66 ("good") has been "flipped" to the other character ("f") provided on the key 26 corresponding that last character (the "DF" key 26).

Figure 6:
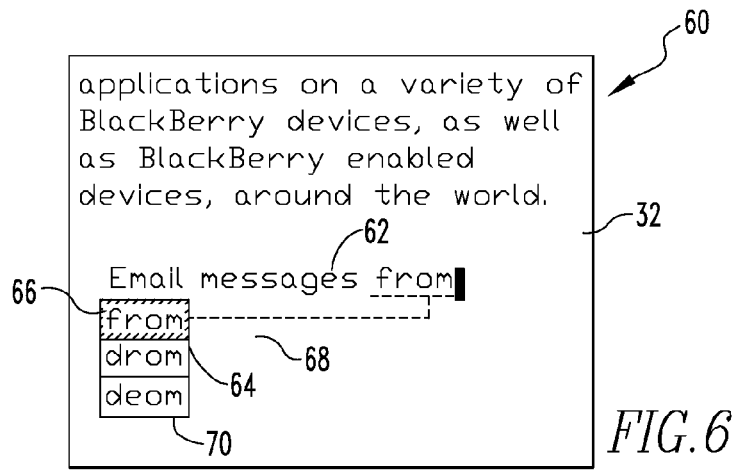

FIG. 6 is yet another example of the output screen 60 that is provided on the display 32. In the example shown in FIG. 6, the output screen 60 results from the user pressing the "DF" key 26 followed by the "ER" key 26 followed by the "OP" key 26 followed "M" key 26. The possible intended inputs generated by the text disambiguation function are "from", "drom", and "deom". The "from" possible intended input is the default portion 66. The key selection sequence described above has no possible intended inputs that are words, and thus a first variant portion 68 is not provided. The "drom" and "deom" possible intended inputs are not words, and thus are included in the second variant portion 70. The key selection sequence described above has no last letter alternative (the "M" key 26 has only one letter), and therefore no the third variant portion 72 has been provided.

Figure 7:
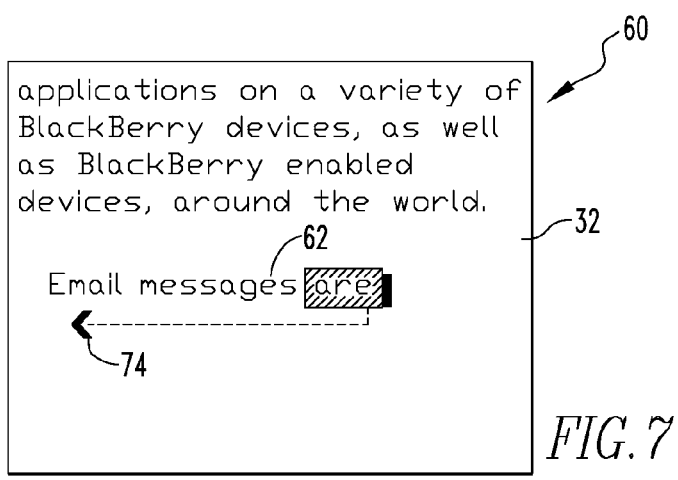
Figure 8:
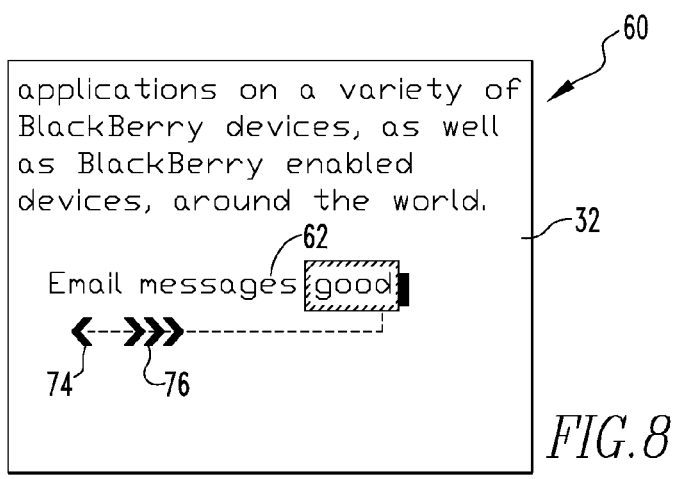
Figure 9:
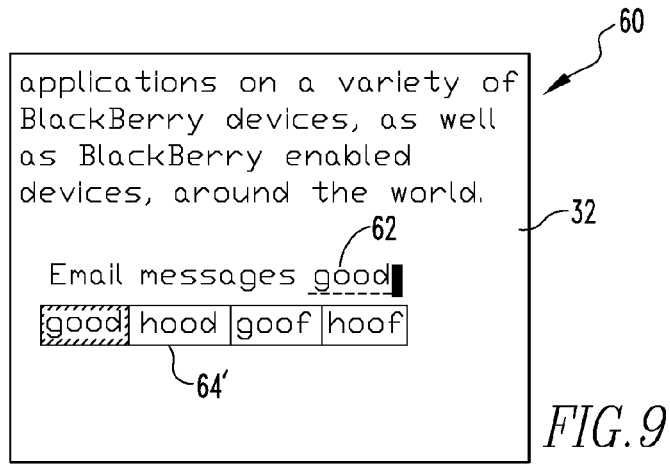
Figure 10:
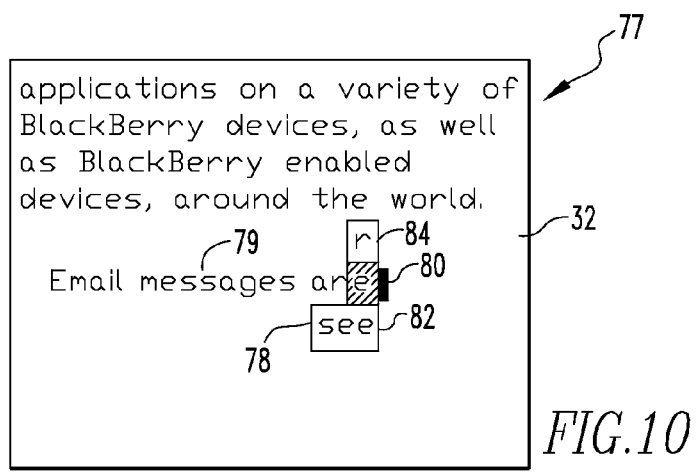
Figure 11:
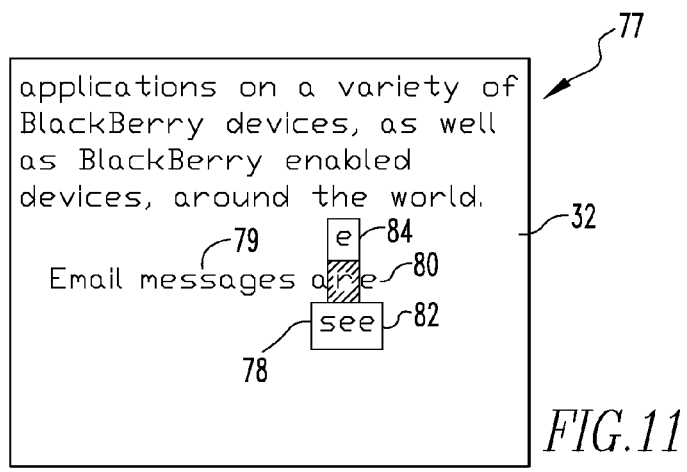

In one particular embodiment, the variant component 64 shown in FIGS. 4-6 is automatically displayed as the user is typing. In an alternative embodiment, illustrated in FIG. 7, the variant component 64 is not displayed as the user is typing, but instead a mechanism is provided for enabling the user to activate and display the variant component 64 when desired as the user is typing. In particular, as seen in FIG. 7, a trackball indicator 74 is provided on the output screen 60 just below the text component 62 which indicates to the user that, if the user navigates left using the trackball 24, the variant component 64 will be displayed so that the user can more easily choose a desired possible intended input generated by the text disambiguation function. In the example shown in FIG. 7, if the user navigates left using the trackball 24, the output screen 60 will (in the illustrated embodiment) appear as shown in FIG. 4. In a further alternative embodiment, illustrated in FIG. 8, a word alternative indicator 76 may be provided on the output screen 60 to indicate to the user that a number of possible intended inputs that are words have been generated by the text disambiguation function. By navigating to the right with the trackball 24, the user is able to cause an alternative variant component 64', shown in FIG. 9, to be displayed on the output screen 60 that includes only the possible intended inputs that are words. In the present embodiment, the user may then select one of the possible intended inputs for inclusion in the text component 62 by navigating to the right using the trackball 24 and pressing the trackball 24 when the desired possible intended input has been highlighted. Preferably, the word alternative indicator 76 also provides an indication of the number of possible intended inputs that are words that have been generated by the text disambiguation function. For example, as shown in FIG. 9, the word alternative indicator 76 may comprise a number of rightward facing arrows, wherein the number of arrows indicates the number of possible intended inputs that are words that have been generated by the text disambiguation function.

Figure 12:
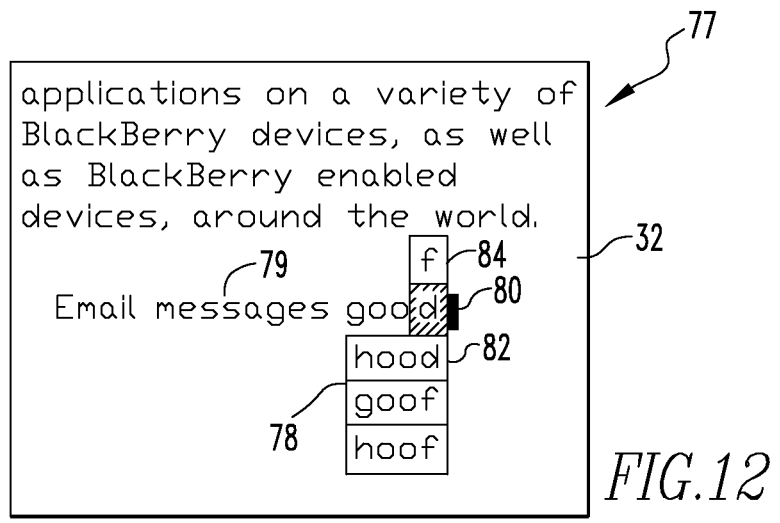
Figure 13:
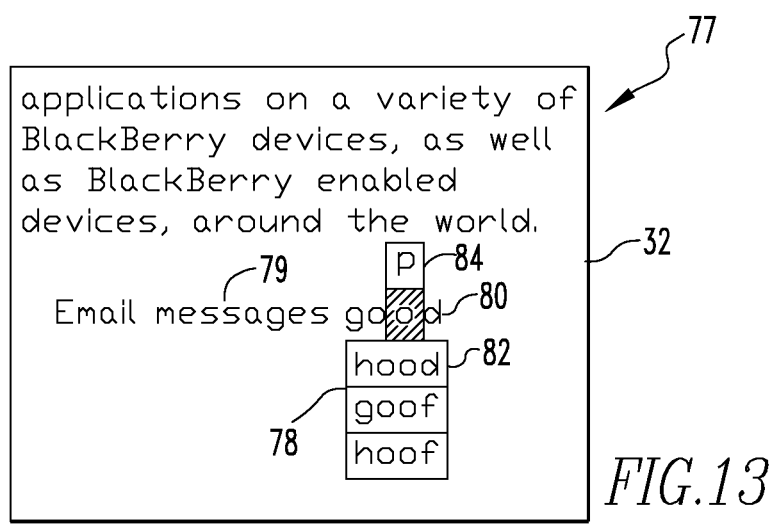

A further alternative embodiment of a display and selection method which organizes the possible intended inputs that are output by the text disambiguation function based on the user's intent is shown in FIGS. 10-13. In this embodiment, an output screen 77 includes a text component 79 and a variant component 78, wherein the variant component 78 includes a default portion 80, a first variant portion 82 including one or more possible intended inputs generated by the text disambiguation function that are words that extends downwardly from the default portion 80, and a second variant portion 84 that extends upwardly from a selected character of the default portion 80 and which represents the other character provided on the key 26 corresponding that selected character. Unlike the variant component 64 shown in FIGS. 4-6, the variant component 78 does not include a variant portion that includes one or more possible intended inputs generated by the text disambiguation function that are not words. In the example shown in FIG. 10, the user has pressed the "AS" key 26 followed by the "ER" key 26 followed by the "ER" key 26 again. As a result, the default portion 80 is the word "are", the first variant component 82 is the word "see", and, because the letter "e" is selected in the default portion 80, the second variant portion is the letter "r". The user may select one of the possible intended inputs in the first variant component 82 (only one is generated in the example shown in FIG. 10) by navigating down (or back up) using the trackball 24 and pressing the trackball 24 when the desired possible intended input is highlighted. In addition, the user may "flip" the last character of the default portion 80 by navigating up using the trackball 24 and pressing the trackball 24. In addition, the user may select other characters of the default portion 80 by navigating to the left (or back to the right) using the trackball 24. As demonstrated in FIG. 11, when the user does so, the second variant portion 84 will change as appropriate with each selected character of the default portion 80. FIGS. 12 and 13 illustrate another example of the output screen 77 according to this embodiment that would result from the user pressing the "GH" key 26 followed by the "OP" key 26 followed by the "OP" key 26 followed "DF" key 26.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of facilitating input into a handheld electronic device having a text disambiguation function, a multi-directional navigation mechanism, a display and a reduced keyboard having a plurality of keys, one or more of said keys having multiple characters associated therewith, the method comprising:

receiving an ambiguous input resulting from a selection of a plurality of said keys;

generating a plurality of possible intended input strings having a same number of characters based on said ambiguous input using said text disambiguation function, the plurality of possible intended input strings including a default string;

organizing said possible intended input strings into a plurality of groups, each of the groups including two or more of the possible intended input strings, the default string belonging to all of the plurality of groups,
  wherein said plurality of groups comprise a first group and a second group,
  wherein each of the possible intended input strings in the first group represents a word, and
  wherein the possible intended input strings in the second group, except the default string, represent letter sequences that do not represent words;

displaying each of said groups on said display in a respective directional orientation relative to a reference location on said display at which the default string is positioned, wherein the respective directional orientation of the first group is perpendicular to the respective directional orientation of the second group; and enabling the selection of one of said possible intended input strings based on a directional input received from said multi-directional navigation mechanism, said directional input being in a direction that corresponds to the directional orientation of the group that includes said one of said possible intended input strings.

2. The method according to claim 1, wherein:
said plurality of groups further comprise a third group, the third group including the default string and an alternate string,
the default string consists of a first initial portion and a first final character,
the alternate string consists of a second initial portion and a second final character,
the first initial ion is the same as the second initial portion,
the first final character and the second final character are different from each other and are associated with a same one of said keys, and
wherein the respective directional orientation of the third group is different than the respective directional orientation of the first group and the respective directional orientation of the second group.

3. The method according to claim 2, wherein the respective directional orientation of the third group is parallel and opposite to the respective directional orientation of the second group.

4. The method according to claim 3, wherein the respective directional orientation of the first group is a horizontal orientation, the respective directional orientation of the second group is a downward vertical orientation, and the respective directional orientation of the third group is an upward vertical orientation.

5. The method according to claim 1, further comprising displaying a first indicator on said display and performing said step of displaying each of said groups in response to receiving a selection of said first indicator.

6. The method according to claim 1, further comprising displaying a first indicator and a second indicator on said display, wherein said steps of displaying each of said groups and enabling the selection of one of said possible intended input strings are performed in response to receiving a selection of said first indicator, and wherein in response to receiving a selection of said second indicator only said first group is displayed on said display.

7. The method according to claim 6, wherein said second indicator provides an indication of the number of possible intended input strings included in said first group.

8. A handheld electronic device, comprising:
a reduced keyboard having a plurality of keys, one or more of said keys having multiple characters associated therewith;
a multi-directional navigation mechanism;
a display;
a processor; and
a memory storing one or more routines executable by said processor, said one or more routines implementing a text disambiguation function and being adapted to:
receive an ambiguous input resulting from a selection of a plurality of said keys;
generate a plurality of possible intended input strings having a same number of characters based on said ambiguous input using said text disambiguation function, the plurality of possible intended input strings including a default string;
organize said possible intended input strings into a plurality of groups, each of the groups including two or more of the possible intended input strings, the default string belonging to all of the plurality of groups,
wherein said plurality of groups comprise a first group and a second group,
wherein each of the possible intended input strings in the first group represents a word, and
wherein the possible intended input strings in the second group, except the default string, represent letter sequences that do not represent words;
display each of said groups on said display in a respective directional orientation relative to a reference location on said display at which the default string is positioned, wherein the respective directional orientation of the first group is perpendicular to the respective directional orientation of the second group; and
enable the selection of one of said possible intended input strings based on a directional input received from said multi-directional navigation mechanism, said directional input being in a direction that corresponds to the directional orientation of the group that includes said one of said possible intended input strings.

9. The handheld electronic device according to claim 8, wherein:
said plurality of groups further comprise a third group, the third group including the default string and an alternate string,
the default string consists of a first initial portion and a final character,
the alternate consists of a second initial portion and a second final character,
the first initial portion is the same as the second initial portion,
the first final character and the second final character are different from each other and are associated with a same one of said keys, and
wherein the respective directional orientation of the third group is different than the respective directional orientation of the first group and the respective directional orientation of the second group.

10. The handheld electronic device according to claim 9, wherein the respective directional orientation of the third group is parallel and opposite to the respective directional orientation of the second group.

11. The handheld electronic device according to claim 10, wherein the respective directional orientation of the first group is a horizontal orientation, the respective directional orientation of the second group is a downward vertical orientation, and the respective directional orientation of the third group is an upward vertical orientation.

12. The handheld electronic device according to claim 8, wherein said routines are further adapted to display a first indicator on said display and display each of said groups only in response to receiving a selection of said first indicator.

13. The handheld electronic device according to claim 8, wherein said routines are further adapted to display a first indicator and a second indicator on said display, wherein said routines are adapted to displaying each of said groups and enable the selection of one of said possible intended input strings only in response to a selection of said first indicator, and wherein said routines are adapted to display said first group on said display in response to a selection of said second indicator.

14. The handheld electronic device according to claim 13, wherein said second indicator provides an indication of the number of possible intended input strings included in said first group.

15. A method of facilitating input into a handheld electronic device having a text disambiguation function, a multidirectional navigation mechanism, a display and a reduced keyboard having a plurality of keys, one or more of said keys having multiple characters provided thereon, the method comprising:

receiving an ambiguous input resulting from a selection of a plurality of said keys;

generating a plurality of possible intended input strings having a same number of characters based on said ambiguous input using said text disambiguation function, wherein the possible intended input strings include a default string;

displaying a variant component on said display, wherein said variant component includes:

a first variant portion having a first group of the possible intended input strings, including the default string, displayed in a first directional orientation relative to said default string, wherein each of the possible intended input strings in the first group represents a word in the current language of the handheld electronic device, and a second variant portion including a second group of the possible intended input strings displayed on said display in a second directional orientation relative to the default string that is different from the first directional orientation, wherein:

the second group of possible intended input strings include said default string and an alternate string, the default string consists of a first initial portion and a first final character, the alternate string consists of a second initial portion and a second final character, the first initial portion is the same as the second initial portion, and the first final character and the second final character are different from each other and are associated with a same one of said keys; and enabling the selection of one of said possible intended input strings in the first group based on a first directional input received from said multi-directional navigation mechanism, said first directional input being in a direction that corresponds to the first directional orientation, and enabling the selection of said alternate string based on a second directional input received from said multi-directional navigation mechanism, said second directional input being in a direction that corresponds to the second directional orientation.

16. A handheld electronic device, comprising:

a reduced keyboard having a plurality of keys, one or more of said keys having multiple characters provided thereon;

a multidirectional navigation mechanism;

a display;

a processor; and a memory storing one or more routines executable by said processor, said one or more routines implementing a text disambiguation function and being adapted to:

receive an ambiguous input resulting from a selection of a plurality of said keys;

generate a plurality of possible intended input strings having a same number of characters based on said ambiguous input using said text disambiguation function, wherein the possible intended input strings include a default string;

display a variant component on said display, wherein said variant component includes:

a first variant portion having a first group of the possible intended input strings, including the default string, displayed in a first directional orientation relative to said default string, wherein each of the possible intended input strings in the first group represents a word in the current language of the handheld electronic device, and a second variant portion including a second group of the possible intended input strings displayed on said display in a second directional orientation relative to the default string that is different from the first directional orientation, wherein the second group of possible intended input strings include said default string and an alternate string, the default string consists of a first initial portion and a first final character, the alternate string consists of a second initial portion and a second final character, the first initial portion is the same as the second initial portion, and the first final character and the second final character are different from each other and are associated with a same one of said keys; and, enable the selection of one of said possible intended input strings in the first group based on a first directional input received from said multi-directional navigation mechanism, said first directional input being in a direction that corresponds to the first directional orientation, and enable the selection of said alternate string based on a second directional input received from said multi-directional navigation mechanism, said second directional input being in a direction that corresponds to the second directional orientation.

* * * * *

UNITED STATES PATENT AND TRADEMARK OFFICE
CERTIFICATE OF CORRECTION

PATENT NO. : 8,462,119 B2
APPLICATION NO. : 11/971472
DATED : June 11, 2013
INVENTOR(S) : Jason Griffin et al.

It is certified that error appears in the above-identified patent and that said Letters Patent is hereby corrected as shown below:

In the Drawings

In FIG. 4, block 70, "are" should read --aer--.

In the Specification

Col. 4, Line 51, "orientation:" should read as --orientation.--.

In the Claims

Claim 16, Col. 12, Line 39, "keys; and," should read as --keys; and--.

Signed and Sealed this
Twenty-third Day of July, 2013

Teresa Stanek Rea
*Acting Director of the United States Patent and Trademark Office*